(12) United States Patent
Matsuoka et al.

(10) Patent No.: US 6,891,569 B1
(45) Date of Patent: May 10, 2005

(54) WIDE ANGLE IMAGE PICKUP APPARATUS

(75) Inventors: Kenji Matsuoka, Kanagawa-ken (JP);
Kenji Taguchi, Kanagawa-ken (JP);
Nobuyuki Matsukawa, Kanagawa-ken (JP); Hidehiro Katoh, Kanagawa-ken (JP); Hiroyuki Miyahara, Kanagawa-ken (JP); Michihiro Aso, Kanagawa-ken (JP); Takayuki Ohtsuka, Kanagawa-ken (JP)

(73) Assignee: Victor Company of Japan Limited, Yokohama (JP)

( * ) Notice: Subject to any disclaimer, the term of this patent is extended or adjusted under 35 U.S.C. 154(b) by 839 days.

(21) Appl. No.: 09/654,885

(22) Filed: Sep. 5, 2000

(30) Foreign Application Priority Data

Sep. 6, 1999 (JP) .......................................... P11-251285

(51) Int. Cl.[7] .............................................. H04N 3/335
(52) U.S. Cl. ....................................................... 348/302
(58) Field of Search ................................. 348/294, 302, 348/311, 314, 317, 220.1; 250/208.1

(56) References Cited

U.S. PATENT DOCUMENTS

| | | | | |
|---|---|---|---|---|
| 4,910,599 A | * | 3/1990 | Hashimoto | 348/240.2 |
| 4,980,771 A | * | 12/1990 | Ueda et al. | 348/323 |
| 5,450,129 A | * | 9/1995 | Matoba et al. | 348/294 |
| 5,486,859 A | * | 1/1996 | Matsuda | 348/311 |
| 5,894,325 A | * | 4/1999 | Yonemoto | 348/302 |
| 6,018,363 A | * | 1/2000 | Horii | 348/219.1 |
| 6,323,900 B1 | * | 11/2001 | Kobayashi | 348/241 |
| 6,335,760 B1 | * | 1/2002 | Sato | 348/397.1 |
| 6,476,852 B1 | * | 11/2002 | Okada | 348/65 |
| 6,496,224 B2 | * | 12/2002 | Ueno | 348/322 |
| 6,507,365 B1 | * | 1/2003 | Nakamura et al. | 348/296 |
| RE38,079 E | * | 4/2003 | Washino et al. | 348/722 |
| 6,580,457 B1 | * | 6/2003 | Armstrong et al. | 348/317 |

FOREIGN PATENT DOCUMENTS

| | | |
|---|---|---|
| EP | 0 753 961 A1 | 1/1997 |
| EP | 0 794 662 A2 | 9/1997 |

OTHER PUBLICATIONS

Kazuhide, Fujikawa et al. "TP 13.1: A ⅓-inch 630k-pixel IT-CCD Image Sensor with Multi-Function Capability". *IEEE International Solid-State Circuits Conference, IEEE Inc.* New York, US; vol. 38; Feb. 1, 1995; pp. 218–219, 370.

* cited by examiner

*Primary Examiner*—Wendy R. Garber
*Assistant Examiner*—Rashawn N Tillery
(74) *Attorney, Agent, or Firm*—Nath & Associates PLLC; Gary M. Nath; Gregory B. Kang

(57) ABSTRACT

A pixel signal outputted from an image pickup device in a standard image pickup region of a solid-state image device and a pixel signal outputted from an image pickup device in a camera shake correction region are written into a first memory and a second memory alternately for each screen. By adjusting the number of lines of a video signal upon reading out a signal from the memory, a moving image is outputted as a wide angle image. Further, by outputting all line signals in the memory, a wider angle still image is obtained.

4 Claims, 5 Drawing Sheets

CAMERA SHAKE CORRECTION REGION (PERIPHERAL IMAGE PICKUP REGION)

STANDARD IMAGE PICKUP REGION

WIDE ANGLE IMAGE PICKUP APPARATUS

BACKGROUND OF THE INVENTION

1. Field of the Invention

The present invention relates to a wide angle image pickup apparatus preferable for use in a camera having a solid-state image device of frame transfer type.

2. Description of the Related Art

An electronic zoom circuit loaded on a camera integrated type VTR is used to obtain an enlarged magnification image which cannot be covered sufficiently by an optical zoom alone, together with the optical zoom. That is, an enlarged image on a telescope which cannot be obtained by the optical zoom alone is generated and secured by interpolation processing between pixels.

On the contrary, on the side of a wide angle in the zoom lens region of the camera integrated type VTR, even if an image is subjected to reduction processing by electronic zoom, only a black belt appears in the periphery of the image. Therefore, generally such an image reduction processing is not carried out. Thus, the angle of view on the side of the wide angle in the camera integrated type VTR is fixed depending on a design of the optical zoom lens.

SUMMARY OF THE INVENTION

Accordingly, if it is intended to enlarge the angle of view on the side of the wide angle in the camera integrated type VTR, the zoom lens is likely to be enlarged because of its design matter, which is a serious problem for a home use camera integrated type VTR. Thus, according to a conventional technology, the angle of view on the side of the wide angle cannot be enlarged so much.

To solve the above problem, there is provided a wide angle image pickup apparatus comprising: a solid-state image device containing a standard image pickup region in which image pickup devices of a number corresponding to the number of horizontal scanning lines of a video image signal in accordance with standard television system are arranged in a vertical direction and a peripheral image pickup region which is provided at least on vertically top and vertically bottom of the standard image pickup region and in which multiple image pickup devices are arranged in the vertical direction; and a reduction processing means for reducing a pixel signal outputted from the standard image pickup region and peripheral image pickup region of the solid-state image device so as to output a video signal having the number of the horizontal scanning lines.

According to a preferred embodiment of the present invention, the solid-state image device reads out a pixel signal from the standard image pickup region and peripheral image pickup region and the reduction processing means contains a memory means in which a pixel signal outputted from the solid-state image device is written and read out synchronously with a vertical synchronous signal of the video signal.

According to a preferred embodiment of the present invention, normal image pickup mode and reduction image pickup mode are further included, wherein under the normal image pickup mode, a pixel signal outputted from the standard image pickup region of the solid-state image device is outputted as the video signal without the reduction processing by the reduction processing means, and under the reduction image pickup mode, a pixel signal outputted from the standard image pickup region and peripheral image pickup region of the solid-state image device is outputted as the video signal with the reduction processing by the reduction processing means.

According to a preferred embodiment of the present invention, the memory means is capable of carrying out write and read of the pixel signal at the same time and under the reduction image pickup mode, the solid-state image device starts output of pixel signals corresponding to a screen at such a timing that a output completion timing of the pixel signal of a screen coincides with a timing of a vertical synchronous signal of the video signal.

Further, to solve the above problem, there is provided a wide angle image pickup apparatus having a solid-state image device containing a standard image pickup region in which image pickup devices of a number corresponding to the number of horizontal scanning lines of a video image signal in accordance with standard television system are arranged in a vertical direction and a peripheral image pickup region which is provided at least on vertically top and vertically bottom of the standard image pickup region and in which multiple image pickup devices are arranged in the vertical direction, the wide angle image pickup apparatus further containing a moving image output mode for outputting the video signal which is a moving image based on a pixel signal outputted from at least the standard image pickup region of the solid-state image device and a still image output mode for outputting pixel signals corresponding to a screen outputted from the standard image pickup region and peripheral image pickup region of the solid-state image device.

The nature, principle and utility of the invention will become more apparent from the following detailed description when read in conjunction with the accompanying drawings.

DESCRIPTION OF THE PREFERRED EMBODIMENTS

Figure 1:
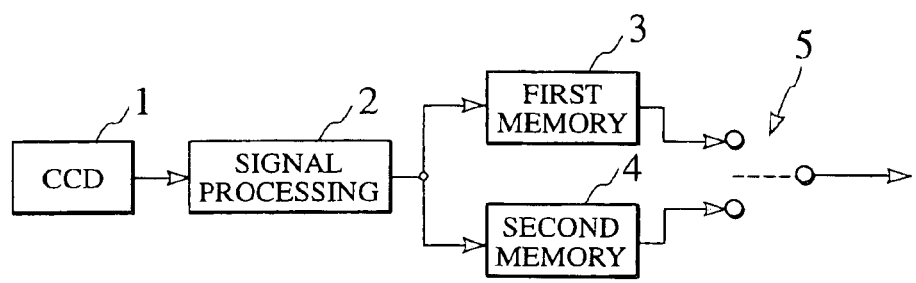
FIG. 1 is a diagram for explaining a wide angle image pickup apparatus according to a first embodiment of the present invention.

FIG. 1 is a diagram for explaining a wide angle image pickup apparatus according to the first embodiment of the present invention. Reference numeral 1 denotes a solid-state image device (CCD) for converting an object image introduced through an image pickup lens (not shown) to a CCD signal (pixel signal) and outputting it. Reference numeral 2 denotes a signal processing circuit for carrying out a predetermined signal processing such as noise removal and signal level adjustment to the CCD signal from the solid-state image device 1 and outputting it. Reference numerals 3, 4 denote first and second memories in which a signal from the signal processing circuit 2 is written alternately and this signal is read out at a predetermined timing which will be described later. Reference numeral 5 denotes a selector for outputting selectively any of a signal read out from the first memory 3 and a signal read out from the second memory 4.

A so-called progressive scan type solid-state image device that is one of the frame transfer types is employed as the solid-state image device 1 and so constructed that pixel data of a frame (a screen composed of pixel data corresponding to odd field and pixel data corresponding to even field) is outputted in the period of a field.

Figure 2:
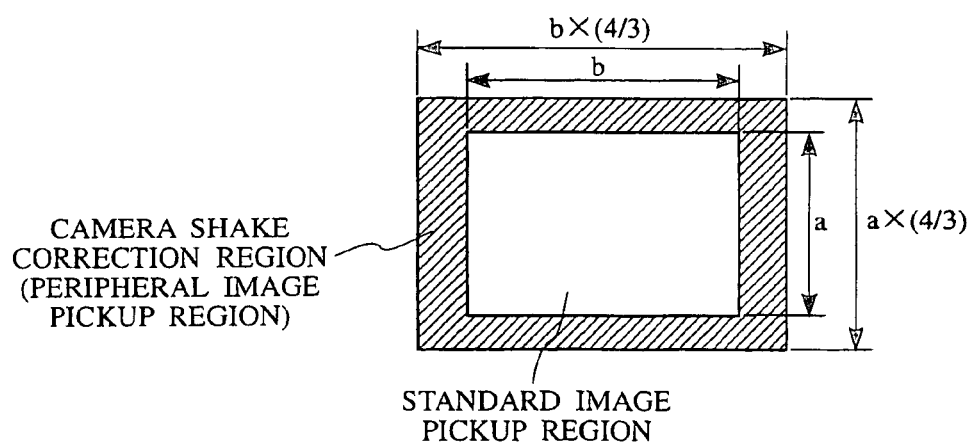
FIG. 2 is a diagram showing an imaging plane of a solid-state image device.

FIG. 2 is a diagram showing an imaging plane of the solid-state image device 1, in which a camera shake correction region is provided around the standard image pickup region. In this camera shake correcting processing, camera shake correcting components are computed based on pixel data read out from the solid-state image device 1 and a read address of the image pickup device is changed horizontally and vertically based on this camera shake correcting components.

In the solid-state image device 1, assuming that the number of pixels to be arranged vertically in the standard image pickup region is "a" and the number of the pixels to be arranged horizontally is "b", the number of pixels in the vertical direction in the image pickup plane including the standard image pickup region and camera shake correction region is "a×(4/3)" and the number of pixels in the horizontal direction is "b×(4/3)".

A feature of the wide angle image pickup apparatus of the present invention is that a wide angel image pickup is enabled using not only the pixel signal from the standard image pickup region of the solid-state image device 1 but also the pixel signal from the camera shake correction region. Hereinafter, an operation of the wide angle image pickup apparatus of the present invention will be described with reference to FIGS. 1–3. The solid-state image device 1 reads out the pixel data corresponding to "a" lines in the vertical direction shown in FIG. 2 in the period of a field under normal image pickup mode and at the same time, carries out camera shake correcting processing as described above. On the contrary, under reduction image pickup mode, the pixel data corresponding to "a×(4/3)" lines including the camera shake correction region as shown in FIG. 2 are read out in the period of 4/3 field.

That is, regardless of the normal image pickup mode and the reduction image pickup mode, the line reading speed in the vertical direction is the same when the pixel data is read out from the solid-state image device 1. Therefore, although read-out is enabled in the period of a field under the normal image pickup mode, the period of 4/3 field is required for the reduction image pickup mode.

Figure 3:
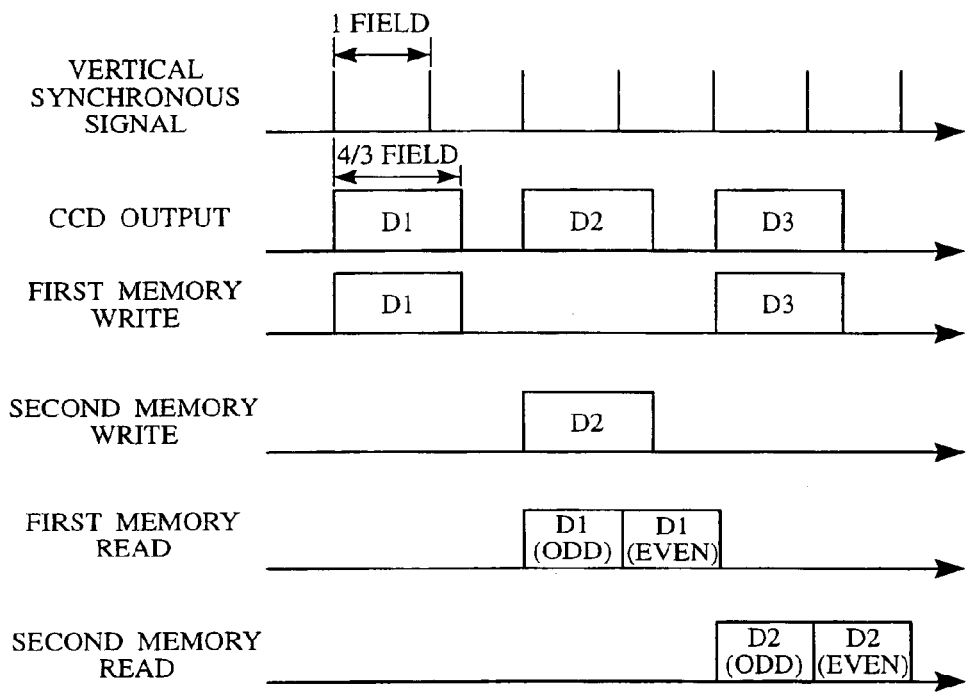
FIG. 3 is a diagram for explaining an operation of the wide angle image pickup apparatus according to the first embodiment of the present invention.

FIG. 3 shows a timing chart for use in taking pictures under the reduction image pickup mode. As shown in the figure, the read-out of the pixel data is started at the timing of vertical synchronous signal when an image signal is outputted from the solid-state image device 1 as an animation. After the period of 4/3 field passes, the read-out of the pixel data corresponding to a screen is completed. Because the period of 4/3 field is required to read out the pixel data of a screen under the reduction image pickup mode, the pixel data corresponding to a screen cannot be outputted in every period of a single vertical synchronous signal and therefore, the pixel data corresponding to a screen is outputted in every two vertical synchronous signal.

In FIG. 3, the pixel data of a first screen outputted from the solid-state image device 1 is D1, the pixel data of a second screen is D2 and the pixel data of a third screen is D3. These pixel data are subjected to a predetermined signal processing by the signal processing circuit 2 as described above and after that, the pixel data are written into the first and second memories alternately so that the pixel data D1 is written to the first memory 3, the pixel data D2 is written to the second memory 4 and the pixel data D3 is written to the first memory 3.

Under the normal image pickup mode, the pixel data corresponding to the "a" lines in the vertical direction are read out from the solid-state image device 1. Under the reduction image pickup mode, the pixel data corresponding to "a×(4/3)" lines in the vertical direction are read out in the period of 4/3 field. Therefore, each of the first and second memories has a memory capacity capable of storing pixel data corresponding to a screen under the reduction image pickup mode (4/3 data amount read out under the normal image pickup mode, that is, a memory capacity corresponding to data amount 8/3 times when the first and second memories are summed up).

Read-out of the pixel data D1 written in the first memory 3 is started at the timing of a next vertical synchronous signal after write of the pixel data D1 into the memory is completed. At that time, only the pixel data D1(odd) corresponding to odd field in the pixel data D1 corresponding to a single screen are selectively read out over the period of a field. After that, only the pixel data D1(even) corresponding to even field in the pixel data in the memory are read out selectively over the period of a field from a next timing of the vertical synchronous signal.

Then, the pixel data D2 corresponding to the second screen are written into the second memory 4 at the timing of starting read-out of the pixel data D1(odd) from the first memory 3. The read-out of the pixel data D2 corresponding to odd field in the pixel data D2 is started at the timing of the next vertical synchronous signal after write of the pixel data D2 of the second screen is completed, that is, at a timing when the read-out of the pixel data D1(even) from the first memory 3 is completed, and then, the read-out of the pixel data D2(even) corresponding to even field is started successively.

Meanwhile, if when pixel data corresponding to the odd field or even field are read out from the first and second memories, all the pixel data in the vertical and horizontal directions written into the memory are read out, the numbers of the pixels in the vertical direction and horizontal direction are 4/3 times as compared to the normal image pickup mode. At this time, if the pixel data are read out by thinning in the vertical and horizontal directions, the pixel data of the same pixel quantity as the normal image pickup mode can be outputted.

It is needless to say that instead of this thinning processing, a more favorable wide angle image can be obtained by carrying out electronic zoom reduction processing at the same time when the pixel data is read out from the memory. As an example of such an electronic zoom reduction processing, a method for generating virtual pixel data at the same position in screen as the normal image pickup mode using multiple pixel data adjacent in the vertical and horizontal directions by means of linear interpolation or spline interpolation is available.

If it is intended to output pixel data read out from the solid-state image device 1 as a still picture, the pixel data corresponding to a screen written in the first or second memory only have to be outputted as they are and at that time, a still picture corresponding to XGA can be obtained.

Next, the wide angle image pickup apparatus according to a second embodiment of the present invention will be described.

Figure 4:
FIG. 4 is a diagram for explaining an operation of the wide angle image pickup apparatus according to the second embodiment of the present invention.

FIG. 4 is a diagram for explaining the wide angle image pickup apparatus according to the second embodiment. In this embodiment, instead of the first memory 3 and second memory 4 of the first embodiment, a third memory 6 is provided.

The solid-state image device 1 and signal processing circuit 2 in the wide angle image pickup apparatus according to the second embodiment and following embodiments are the same as a structure of the wide angle image pickup apparatus of the first embodiment. Thus, only the third memory 6 will be described. Here, the third memory 6 has a memory capacity similar to data amount 7/3 times reading data amount under the normal image pickup mode.

Figure 5:
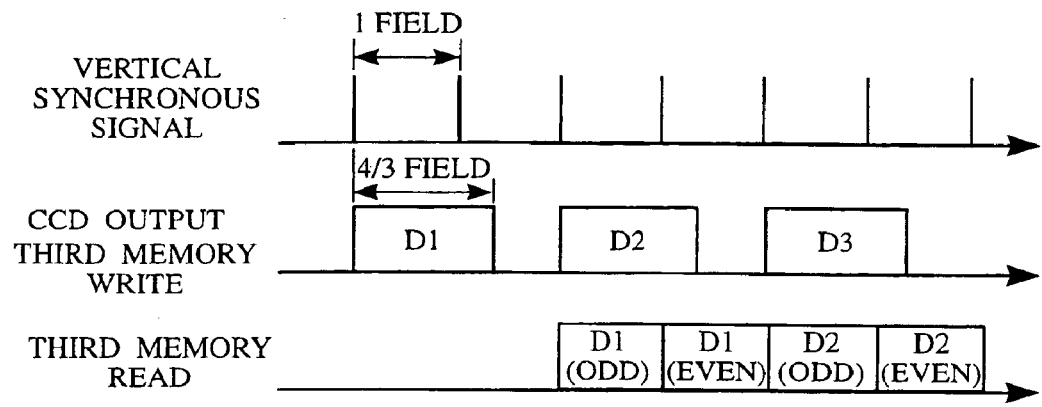
FIG. 5 is a diagram for explaining an operation of the wide angle image pickup apparatus according to the second embodiment of the present invention.
Figure 6:
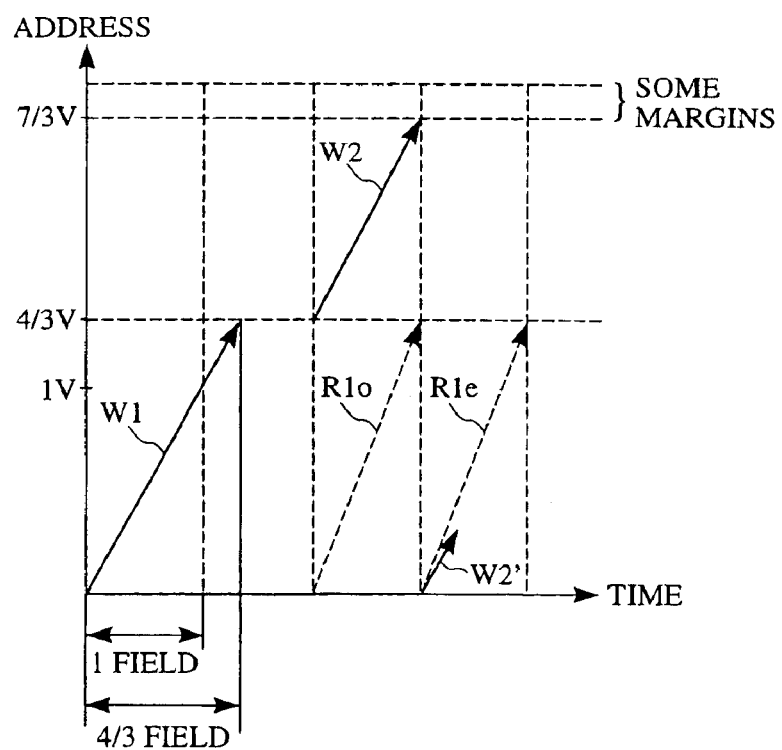
FIG. 6 is a diagram showing a write address and read address for a memory in the wide angle image pickup apparatus according to the second embodiment of the present invention.

FIG. 5 is a timing chart for use in taking pictures under the reduction image pickup mode in the wide angle image pickup apparatus according to the second embodiment. FIG. 6 is a diagram showing addresses upon writing and reading the pixel data in the third memory 6.

The pixel data D1 at the same timing as shown in FIG. 3 are read from the solid-state image device 1 and after the period of 4/3 field passes, read-out of the pixel data D1 is completed. Then, the pixel data D1 outputted from the solid-state image device 1 are written into the third memory 6 at the same timing. Then, the pixel data D1(odd) corresponding to the odd field in the pixel data D1 are read out at a timing of a next vertical synchronous signal and at the same time, the pixel data D2 are written into another region in the memory.

FIG. 6 indicates a write address at that time. A state in which the pixel data D1 are written in the period of 4/3 field is indicated by W1, a state in which the pixel data D1(odd) corresponding to odd field in this pixel data D1 are read out in the period of a field is indicated by R1o, a state in which the pixel data corresponding to even field in the pixel data D1(even) are read out in the period of a field is indicated by R1e, and a state in which the pixel data D2 are written in the period of 4/3 field is indicated by W2 and W2'.

If the write (W1) of the pixel data D1 is completed, a read-out (R1o) of the pixel data D1(odd) is started at a next vertical synchronous signal timing and then, a write (W2) of the pixel data D2 in another region of the memory is started. The pixel data D2 are written into other region without being written over the pixel data D1 already written in the memory, at least until the read-out (R1o) of the pixel data D1 (odd) is completed (W2). Thus, the third memory 6 needs to have a memory capacity corresponding to data amount 7/3 times the reading data amount under the normal image pickup mode.

Then, the read (R1e) of the pixel data D1 (even) is started after the read (R1o) of the pixel data D1 (odd) is completed. At this time, a remainder of the pixel data D2 is written into the address region of the pixel data D1 already read out (W2').

Because the memory corresponding to data amount 7/3 times data amount read out under the normal image pickup mode is used and the startup of the pixel data D2 is set up just after the startup of the read-out of the pixel data D1 (even), the memory capacity can be reduced as compared to the wide angle image pickup apparatus of the first embodiment.

Next, the wide angle image pickup apparatus according to a third embodiment of the present invention will be described below.

In the wide angle image pickup apparatus of the third embodiment, the memory capacity is reduced further as compared to the third memory 6 of the wide angle image pickup apparatus of the second embodiment. The memory needs to have a capacity corresponding to 5/3 times the reading data amount under the normal image pickup mode.

Figure 7:
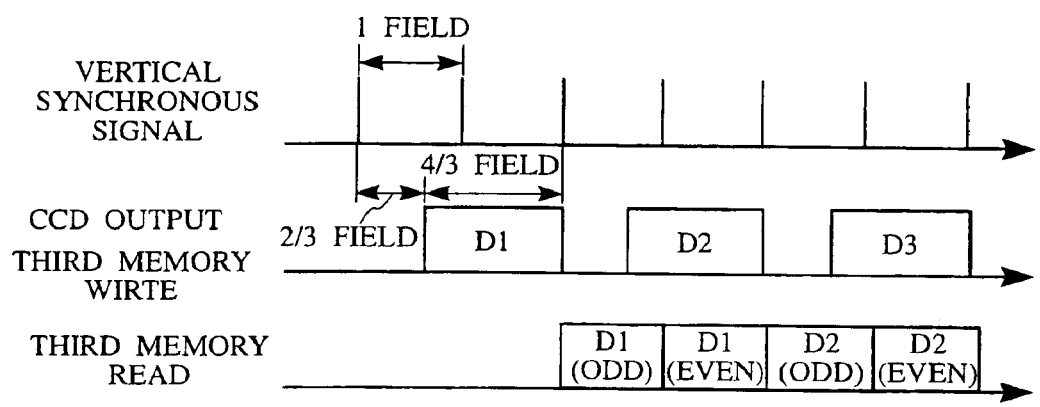
FIG. 7 is a diagram for explaining an operation of the wide angle image pickup apparatus according to a third embodiment of the present invention.
Figure 8:
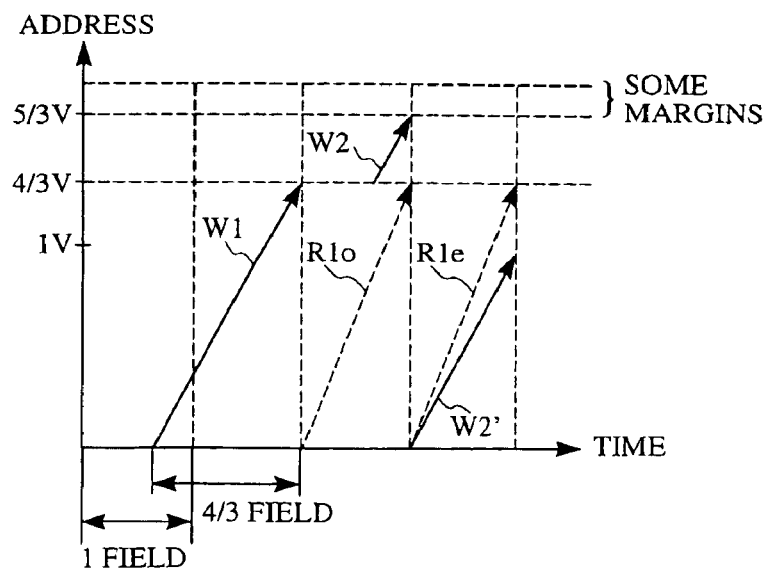
FIG. 8 is a diagram showing a write address and read address for a memory in the wide angle image pickup apparatus according to the third embodiment of the present invention.

FIG. 7 shows a timing chart for use in taking pictures under the reduction image pickup mode in the wide angle image pickup apparatus of the third embodiment. FIG. 8 is a diagram showing addresses upon write and read of the pixel data in the third memory 6.

In the wide angle image pickup apparatus of this embodiment, as shown in FIG. 7, the read-out of the pixel data from the solid-state image device 1 is not started at the timing of the vertical synchronous signal, but the read-out of the pixel data is started at such a timing that a completion of reading of the pixel data from the solid-state image device 1 coincides with the vertical synchronous signal timing. That is, the reading of the pixel data is started later by the period of 2/3 field than the vertical synchronous signal timing.

If the reading of the pixel data D1 from the solid-state image device 1 is started, after the period of 4/3 field passes, the reading of the pixel data D1 corresponding to a screen is completed. Then, the pixel data D1 outputted from the solid-state image device 1 are written into the third memory 6 at the same timing as this reading and then, the reading of the pixel data D1(odd) corresponding to the odd field in the pixel data D1 is started at the timing of the vertical synchronous signal, the timing at which the writing of the pixel data D1 is just completed. Then, after the period of 2/3 field passes, the writing of the pixel data D2 into other region is started.

FIG. 8 shows a write address and a read address at that time. In this figure, a state in which the pixel data D1 are written in the period of 4/3 field is indicated by W1, a state in which the pixel data D1(odd) corresponding to odd field in the pixel data D1 are read out in the period of a field is indicated by R1o, a state in which the pixel data D1 (even) corresponding to even field in the pixel data D1 are read out in the period of a field is indicated by R1e, and a state in which the pixel data D2 are written in the period of 4/3 field is indicated by W2 and W2'.

If the writing (W1) of the pixel data D1 is completed, the reading (R1o) of the pixel data D1 (odd) is started at the same timing. Then, after a period of 2/3 field passes after the reading of the pixel data D1 (odd) is started, the writing (W2) of the pixel data D2 in other region of the memory is started.

At least until the reading of the pixel data D1(odd) is completed with this condition, the pixel data D2 are written into other region without being written over the pixel data D1 written in the memory (W2). Thus, the third memory needs to have a memory capacity corresponding to data amount 5/3 times the reading data amount under the normal image pickup mode.

Then, after the reading of the pixel data D1(odd) is completed, the reading of the pixel data D1(even) is started. At that time, a remainder of the pixel data D2 is written into an address region of the pixel data D1 already read out (W2').

By shifting the write timing of the pixel data into the memory, the memory capacity can be further reduced as compared to the wide angle image pickup apparatus of the first and second embodiments.

Next, the wide angle image pickup apparatus according to a fourth embodiment of the present invention will be described.

In the wide angle image pickup apparatus of the fourth embodiment, the memory capacity is reduced further as compared to the above described embodiments. In this case, a memory corresponding to data amount 4/3 times the reading data amount under the normal image pickup mode is used.

Figure 9:
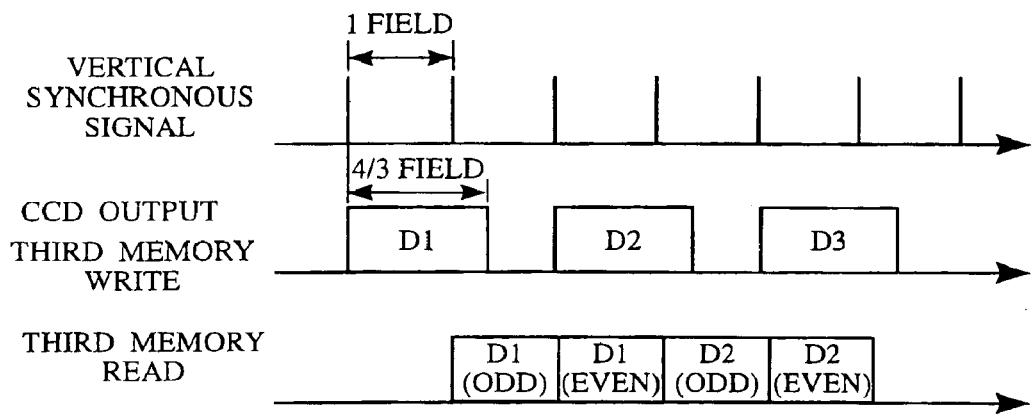
FIG. 9 is a diagram for explaining an operation of the wide angle image pickup apparatus according to a fourth embodiment of the present invention.
Figure 10:
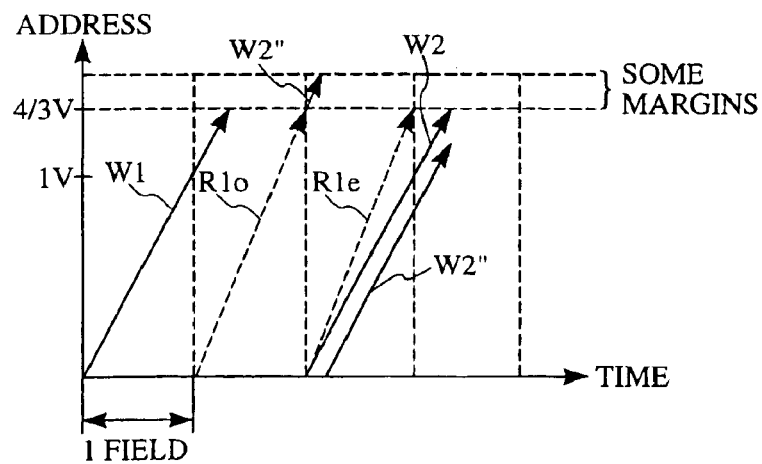
FIG. 10 is a diagram showing a write address and read address for a memory in the wide angle image pickup apparatus according to the fourth embodiment of the present invention.

FIG. 9 is a timing chart for use in taking pictures under the reduction image pickup mode in the wide angle image pickup apparatus of the fourth embodiment. FIG. 10 is a diagram showing a write address and a read address of the pixel data in the third memory 6.

The reading of the pixel data D1 from the solid-state image device 1 is started at the timing of the vertical synchronous signal and after a period of 4/3 field passes, the reading of the pixel data D1 corresponding to a screen is completed. Then, the pixel data D1 outputted from the solid-state image device 1 are written into the third memory 6 at the same timing as reading. Then, the reading of the pixel data D1(odd) corresponding to odd field in the pixel data D1 is started at the timing of a vertical synchronous signal next to the vertical synchronous signal which has started writing of the pixel data D1.

Then, reading of the pixel data D1(even) corresponding to even field is started at the timing that the reading of the pixel data D1(odd) corresponding to odd field is completed and then, the writing of the pixel data D2 is started just after the reading of the pixel data D1(even) is started.

FIG. 10 shows write address and read address at that time. A state in which the pixel data D1 are written in the period of 4/3 field is indicated by W1, a state in which the pixel data D1(odd) corresponding to odd field in this pixel data D1 are read in the period of a field is indicated by R1o, a state in which the pixel data D1 (even) corresponding to even field in the pixel data D1 are read in the period of a field is indicated by R1e and a state in which the pixel data D2 are written in the period of 4/3 field is indicated by W2.

In the wide angle image pickup apparatus of this embodiment, the writing (W1) of the pixel data D1 is started and at the timing of a next vertical synchronous signal, the reading (R1o) of the pixel data D1 (odd) is started. Because the pixel data D1 at a region which should be read out has been already written into the memory although the writing of the pixel data D1 is not completed, this is not a problem for carrying out the reading.

If the reading (R1o) of the pixel data D1(odd) is completed, the reading (R1e) of the pixel data D1(even) is started subsequently. Just after the reading of the pixel data D1(even) is started, the writing (W2) of the pixel data D2 is started.

As described above, in the wide angle image pickup apparatus of this embodiment, the reading of the pixel data D1(odd) is started at the timing of a vertical synchronous signal next to a vertical synchronous signal which has started the writing of the pixel data D1. As a result, a wide angle image can be obtained only with a memory capacity capable of storing the pixel data corresponding to a single screen under the reduction image pickup mode.

According to the second to fourth embodiments described above, by providing the respective memory capacities with some margins, it is possible to prevent a phenomenon that the writing timing of the pixel data into the memory is accelerated with respect to the reading timing of the pixel data.

That is, in FIGS. 6 and 8, by providing the memory capacity with some margins, the writing amount of the pixel data D2 by W2 can be set larger than an indicated state. As a result, the writing start timing by W2' can be retarded sufficiently as compared to the reading (R1e) start timing of the pixel data D1(even).

In this particular case, it is needless to say that the timing at which the writing (W2') is started corresponds to the timing at which the writing (W2) is completed.

In FIG. 10, by providing the memory capacity with some margins, the writing of the pixel data D2 by W2 is changed like W2". As a result, the writing start timing by W2" can be retarded sufficiently as compared to the reading (R1e) start timing of the pixel data D1(even).

In the above description, all the pixel data of "a" lines read out from the solid-state image device 1 are written into a memory so as to form a squeeze image when the pixel data are read out from the memory under the normal image pickup mode. If it is not necessary to output as the squeeze image, it is permissible to read out the pixel data in the standard image pickup region from the solid-state image device 1 and write it into the memory.

According to the wide angle image pickup apparatus of the present invention, the video image signal is generated using not only the image pickup device in the standard image pickup region of the solid-state image device but also the image pickup device in the peripheral image pickup region. Thus, if this is applied to a camera integrated type VTR, the angle of view on the side of a wide angle can be enlarged easily and an enlargement of the optical zoom lens can be avoided.

It should be understood that many modifications and adaptations of the invention will become apparent to those skilled in the art and it is intended to encompass such obvious modifications and changes in the scope of the claims appended hereto.

What is claimed is:

1. A wide angle image pickup apparatus comprising:
   a solid-state image device containing a standard image pickup region in which image pickup devices of a number corresponding to the number of horizontal scanning lines of a video image signal in accordance with standard television system are arranged in a vertical direction and a peripheral image pickup region which is provided at least on vertically top and vertically bottom of said standard image pickup region and in which multiple image pickup devices are arranged in the vertical direction; and
   a reduction processing means for reducing a pixel signal outputted from the standard image pickup region and peripheral image pickup region of said solid-state image device so as to output a video signal having said number of the horizontal scanning lines, wherein said peripheral image pickup region is a camera shake correction region provided for performing camera shake correction processing on the video signal.

2. A wide angle image pickup apparatus according to claim 1 wherein said solid-state image device reads out a pixel signal from said standard image pickup region and peripheral image pickup region and said reduction processing means contains a memory means in which a pixel signal outputted from said solid-state image device is written and read out synchronously with a vertical synchronous signal of said video signal.

3. A wide angle image pickup apparatus according to claim 1 further including normal image pickup mode and reduction image pickup mode, wherein under said normal image pickup mode, a pixel signal outputted from the standard image pickup region of said solid-state image device is outputted as said video signal without said reduction processing by said reduction processing means, and under said reduction image pickup mode, a pixel signal outputted from the standard image pickup region and peripheral image pickup region of said solid-state image device is outputted as said video signal with said reduction processing by said reduction processing means.

4. A wide angle image pickup apparatus according to claim 3 wherein said memory means is capable of carrying out write and read of said pixel signal at the same time and under said reduction image pickup mode, said solid-state image device starts output of pixel signals corresponding to a screen at such a timing that a output completion timing of the pixel signal of a screen coincides with a timing of a vertical synchronous signal of said video signal.

* * * * *